(12) United States Patent
Park et al.

(10) Patent No.: US 11,081,703 B2
(45) Date of Patent: Aug. 3, 2021

(54) METHOD OF PREPARING A CATALYST FOR A FUEL CELL WITHOUT A CARBON SUPPORT

(71) Applicants: HYUNDAI MOTOR COMPANY, Seoul (KR); KIA MOTORS CORPORATION, Seoul (KR); RESEARCH & BUSINESS FOUNDATION SUNGKYUNKWAN UNIVERSITY, Suwon-si (KR)

(72) Inventors: Ju Ahn Park, Yongin-si (KR); Sung Ho Park, Seongnam-si (KR)

(73) Assignees: HYUNDAI MOTOR COMPANY, Seoul (KR); KIA MOTORS CORPORATION, Seoul (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 180 days.

(21) Appl. No.: 16/394,468

(22) Filed: Apr. 25, 2019

(65) Prior Publication Data

US 2020/0203735 A1  Jun. 25, 2020

(30) Foreign Application Priority Data

Dec. 20, 2018  (KR) .......................... 10-2018-0165766

(51) Int. Cl.
*H01M 4/92* (2006.01)
*H01M 4/90* (2006.01)
(Continued)

(52) U.S. Cl.
CPC ............. *H01M 4/928* (2013.01); *B01J 23/40* (2013.01); *B01J 35/0033* (2013.01); *B01J 37/00* (2013.01);
(Continued)

(58) Field of Classification Search
CPC ........ B01J 35/0033; B01J 37/00; B01J 23/40; H01M 4/928; H01M 4/8825; H01M 4/9091
(Continued)

(56) References Cited

U.S. PATENT DOCUMENTS 9,239,327 B2 *  1/2016  Natan .................. G01N 33/532
9,388,477 B1 *  7/2016  Sun ........................ B01J 27/13
(Continued)

FOREIGN PATENT DOCUMENTS

KR      20180042874      4/2018
KR      101862822 B1     5/2018

OTHER PUBLICATIONS

Hao Ming Chen et al., "Hollow Platinum Spheres with Nano-Channels: Synthesis and Enhanced Catalysis for Oxygen Reduction." Journal of Physical Chemistry Letters C, 112, pp. 7522-7526. (Year: 2008).*

(Continued)

*Primary Examiner* — Patricia L. Hailey
(74) *Attorney, Agent, or Firm* — Lempia Summerfield Katz LLC

(57) ABSTRACT

A method of preparing a catalyst for a fuel cell includes no carbon support. The method of preparing a catalyst for a fuel cell includes preparing a first metal nanoparticle having a polyhedral shape, growing a second metal along the edge of the first metal nanoparticle, and removing the first metal nanoparticle.

18 Claims, 24 Drawing Sheets

(51) Int. Cl.
   *H01M 4/88*   (2006.01)
   *B01J 23/40*  (2006.01)
   *B01J 35/00*  (2006.01)
   *B01J 37/00*  (2006.01)

(52) U.S. Cl.
   CPC ....... *H01M 4/8825* (2013.01); *H01M 4/9091* (2013.01)

(58) Field of Classification Search
   USPC .......................................... 502/345
   See application file for complete search history.

(56) References Cited

U.S. PATENT DOCUMENTS

| | | | | |
|---|---|---|---|---|
| 10,038,198 | B2* | 7/2018 | Shao | H01M 8/1007 |
| 2010/0009338 | A1* | 1/2010 | Zhang | H01L 29/0673 |
| | | | | 435/5 |
| 2012/0015211 | A1* | 1/2012 | Gu | H05B 3/145 |
| | | | | 428/651 |
| 2013/0177838 | A1* | 7/2013 | Wang | B01J 23/52 |
| | | | | 429/524 |
| 2013/0344421 | A1* | 12/2013 | Montaut | H01M 4/88 |
| | | | | 429/524 |
| 2014/0106261 | A1* | 4/2014 | Kongkanand | H01M 4/92 |
| | | | | 429/535 |
| 2016/0181622 | A1* | 6/2016 | Dutta | C22C 1/0466 |
| | | | | 429/401 |
| 2017/0073796 | A1* | 3/2017 | Yin | C22F 1/14 |

OTHER PUBLICATIONS

Jingyi Chen et al., "Optical Properties of Pd-Ag and Pt-Ag Nanoboxes Synthesized via Galvanic Replacement Reactions." Nano Letters, vol. 5, INo. 10, pp. 2058-2062. (Year: 2005).*

Xianmao Lu et al., "Galvanic replacement reaction: a simple and powerful route to hollow and porous metal nanostructures." Journal of Nanoengineering and Nanosystems, vol. 22, Part N; pp. 1-16. (Year: 2008).*

Nathanael R. Sieb et al., "Hollow Metal Nanorods with Tunable Dimensions, Porosity, and Photonic Properties." ACS Nano, vol. 3, No. 6, pp. 1365-1372. (Year: 2009).*

Xiaohu Xia et al., "25th Anniversary Article: Galvanic Replacement: A Simple and Versatile Route to Hollow Nanostructures with Tunable and Well-Controlled Properties." Advanced Materials, 25, pp. 6313-6333. (Year: 2013).*

J. Zhang et al., "Stabilization of Platinum Oxygen-Reduction Electrocatalysts Using Gold Clusters." Science, vol. 315, pp. 220-222. (Year: 2007).*

* cited by examiner

METHOD OF PREPARING A CATALYST FOR A FUEL CELL WITHOUT A CARBON SUPPORT

CROSS-REFERENCE TO RELATED APPLICATION

This application claims under 35 U.S.C. § 119(a) the benefit of priority to Korean Patent Application No. 10-2018-0165766 filed on Dec. 20, 2018, the entire contents of which are incorporated herein by reference.

BACKGROUND

(a) Technical Field

The present disclosure relates to a method of preparing a catalyst for a fuel cell including no carbon support.

(b) Background Art

A fuel cell is a system that converts chemical energy of a fuel to electrical energy. In principle, water is the only byproduct that is generated during electricity generation by a fuel cell. Thus, fuel cells are attracting attention as a clean energy source having high output and high conversion efficiency compared to conventional internal combustion engines.

A fuel cell generates electromotive force by supplying fuel gas containing hydrogen to an anode and supplying oxidation gas containing oxygen to a cathode.

An oxidation reaction, which is represented by Formula (1) below, occurs at the anode, and a reduction reaction, which is represented by Formula (2) below, occurs at the cathode. An overall reaction, which is represented by Formula (3) below, occurs, thereby supplying electromotive force to an external circuit.

$$H_2 \rightarrow 2H^+ + 2e^- \quad \text{Formula (1)}$$

$$(\tfrac{1}{2})O_2 + 2H^+ + 2e^- \rightarrow H_2O \quad \text{Formula (2)}$$

$$H_2 + (\tfrac{1}{2})O_2 \rightarrow H_2O \quad \text{Formula (3)}$$

Examples of fuel cells include polymer electrolyte membrane fuel cells (PEFCs), phosphoric acid fuel cells (PAFCs), molten carbonate fuel cells (MCFCs), and solid oxide fuel cells (SOFCs) depending on the type of electrolyte.

Among these fuel cells, the polymer electrolyte membrane fuel cells (PEFCs) and the phosphoric acid fuel cells (PAFCs) use a catalyst for promoting an oxygen reduction reaction (ORR), which includes a conductive carbon support and metal having excellent catalytic activity, such as platinum or platinum alloy, supported on the carbon support, as a cathode catalyst.

However, the catalytic activity and durability of a platinum catalyst supported on the carbon support are deteriorated due to degradation by the carbon support, Ostwald ripening or decomposition of platinum particles, or the like. To solve this problem, there has been technology developed to use titanium, rather than carbon, as a support, which is disclosed in Korean Patent Registration No. 10-1862822. There is technology to dope nitrogen (N) into a carbon support, which is disclosed in Korean Patent Laid-open Publication No. 10-2018-0042874.

The above information disclosed in this Background section is only for enhancement of understanding of the background of the disclosure and therefore it may contain information that does not form the prior art that is already known in this country to a person having ordinary skill in the art.

SUMMARY OF THE DISCLOSURE

The present disclosure has been made in an effort to solve the above-described problems associated with the prior art.

It is an object of the present disclosure to provide a method of preparing a catalyst for a fuel cell, which is self-supported without a carbon support and has excellent activity for an oxygen reduction reaction.

However, the objects to be accomplished by the disclosure are not limited to the above-mentioned object. The objects of the disclosure will be more apparent from the following description and will be realized by means of the elements and combinations thereof pointed out in the appended claims.

In one aspect, the present disclosure provides a method of preparing a catalyst for a fuel cell. The method includes preparing a first metal nanoparticle, growing second metal along the edge of the first metal nanoparticle, and removing the first metal nanoparticle.

In an embodiment, the first metal may be selected from the group consisting of Au, Cu, Co, and combinations thereof.

In another embodiment, the first metal nanoparticle may have an average particle size of 40 nm to 70 nm.

In still another embodiment, the second metal may be selected from the group consisting of Pt, Rh, Ru, and combinations thereof.

In yet another embodiment, the second metal may site-selectively grow along the edge of the first metal nanoparticle.

In still yet another embodiment, the growing the second metal may include precipitating a trace of a third metal on a surface of the first metal nanoparticle and replacing the third metal precipitated on the edge of the first metal nanoparticle with the second metal.

In a further embodiment, the third metal may be selected from the group consisting of Ag, Cu, Ni, and combinations thereof.

In another further embodiment, in the replacing the third metal with the second metal, the third metal may be replaced with the second metal through a galvanic replacement reaction.

In still another further embodiment, in the growing the second metal, the second metal may grow along the edge of the first metal nanoparticle to form a frame having the same shape as the polyhedral shape of the first metal nanoparticle.

In yet another further embodiment, the removing the first metal nanoparticle may include etching the first metal nanoparticle in a solution using an etching agent.

In still yet another further embodiment, in the removing the first metal nanoparticle, the first metal nanoparticle may be removed so that the first metal is left behind on the inner surface of the frame of the second metal in the form of a thin film.

In another aspect, the present disclosure provides a method of preparing a catalyst layer for a fuel cell. The method may include dropping a droplet including the above-described catalyst onto a substrate and evaporating the droplet.

In an embodiment, the evaporating the droplet may be performed at a temperature of 30° C. to 70° C.

In another embodiment, the catalyst layer may be formed by self-assembly of the catalyst as the droplet is evaporated.

In still another embodiment, the catalyst layer may have a thickness of 2 μm to 12 μm.

Other aspects and embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 9A shows measurement of the shape of the catalyst. FIG. 9B shows measurement of the element distribution of platinum (Pt) included in the catalyst. FIG. 9C shows measurement of the element distribution of gold (Au) included in the catalyst.

FIGS. 14A-14O show the results of analysis of the cross-sections of catalyst layers, which have different thicknesses from the catalyst layer of Example 4, using a scanning electron microscope (SEM). FIG. 14A shows the result of analysis of a catalyst layer having a thickness of 2 μm.

Figure 1:
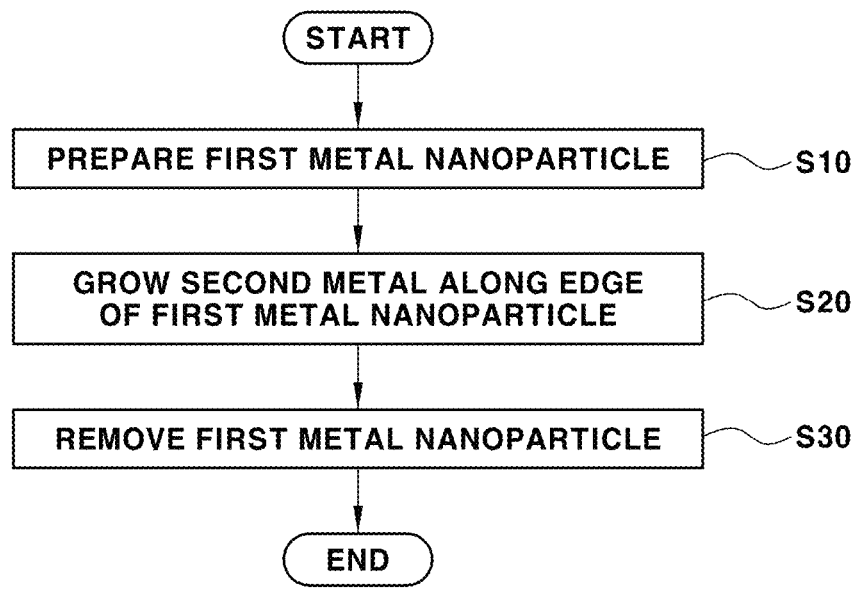
FIG. 1 is a flowchart showing a method of preparing a catalyst for a fuel cell according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The above objects, other objects, features and advantages of the disclosure will be easily understood through several embodiments with reference to the accompanying drawings. The disclosure may, however, be embodied in many different forms and should not be construed as being limited to the embodiments set forth herein. Rather, these embodiments are provided so that this disclosure will be thorough and complete and will fully convey the concept of the disclosure to those having ordinary skill in the art.

In the drawings, the same or similar elements are denoted by the same reference numerals even though they are depicted in different drawings. In the drawings, the sizes of structures are exaggerated for clarity. It will be understood that, although the terms "first", "second", etc. may be used herein to describe various elements, these elements should not be limited by these terms. These terms are only used to distinguish one element from another. For example, a first element could be termed a second element. Similarly, a second element could be termed a first element, without departing from the scope of the present disclosure. Singular forms are intended to include plural forms as well, unless the context clearly indicates otherwise.

It will be further understood that the terms "comprises", "includes", and/or "has", when used in this specification, specify the presence of stated features, integers, steps, operations, elements, components, or combinations thereof, but do not preclude the presence or addition of one or more other features, integers, steps, operations, elements, components, or combinations thereof. In addition, it will be understood that when an element such as a layer, film, region, or plate is referred to as being "on" another element, it can be directly on the other element or intervening elements may also be present. It will also be understood that when an element such as a layer, film, region, or plate is referred to as being "under" another element, it can be directly under the other element or intervening elements may also be present.

Unless otherwise indicated, all numbers, values and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, where a numerical range is disclosed herein, such range is continuous and includes unless otherwise indicated, every value from the minimum value to and including the maximum value of such range. Still further, where such a range refers to integers, unless otherwise indicated, every integer from the minimum value to and including the maximum value is included.

FIG. 1 is a flowchart showing a method of preparing a catalyst for a fuel cell according to the present disclosure. Referring to FIG. 1, the catalyst preparation method includes a step of preparing a first metal nanoparticle 10 having a polyhedral shape (S10), a step of growing second metal along the edge of the first metal nanoparticle (S20), and a step of removing the first metal nanoparticle (S30).

Figure 2:
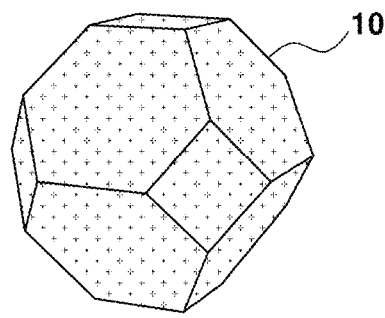
FIG. 2 is a view schematically showing a first metal nanoparticle.

FIG. 2 is a view schematically showing the first metal nanoparticle 10. The shape of the first metal nanoparticle 10 is not limited to the shape shown in FIG. 2 but may be any one of various other polyhedral shapes, so long as it includes an edge where faces meet.

The first metal may be selected from the group consisting of Au, Cu, Co, and combinations thereof, and in one example, may be gold (Au).

The first metal nanoparticle 10 may have an average particle size of 40 nm to 70 nm. When the average particle size falls within the above numerical range, the frame of the finally obtained second metal may maintain the shape thereof and fuel may be smoothly introduced into the frame. The average particle size as noted above may be measured using a commercially available laser diffraction-scattering type particle size distribution analyzer, e.g. a Microtrac particle size distribution analyzer. Alternatively, 200 particles may be extracted arbitrarily from a scanning electron microscope picture, and the particle sizes may be measured to calculate the average thereof.

Figure 3:
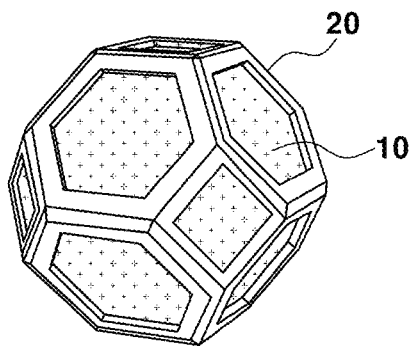
FIG. 3 is a view showing a first metal nanoparticle and second metal, which has grown along the edge of the first metal nanoparticle.

FIG. 3 is a view showing the first metal nanoparticle 10 and a second metal 20, which has grown along the edge of the first metal nanoparticle 10.

Step S20 of growing the second metal 20 along the edge of the first metal nanoparticle 10, as shown in FIG. 3, may be performed by site-selectively growing the second metal 20 along the edge of the first metal nanoparticle 10. In this example, the term "site-selective growing" means intentionally growing the second metal 20 only in a specific region.

The present disclosure is characterized in that the first metal nanoparticle 10 has a polyhedral shape and the second metal 20 grows only along the edge of the polyhedron using the surface energy difference between the face and edge of the polyhedron. A detailed description thereof will be made later.

The second metal 20 may be selected from the group consisting of Pt, Rh, Ru, and combinations thereof, and in one example, may be platinum (Pt).

Figure 4:
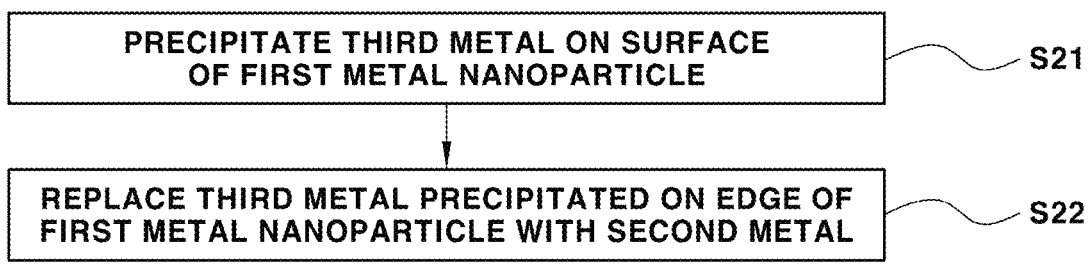
FIG. 4 is a flowchart showing detailed steps of a step of growing the second metal along the edge of the first metal nanoparticle.

FIG. 4 is a flowchart showing detailed steps of step S20 of growing the second metal 20 along the edge of the first metal nanoparticle 10. Referring to FIG. 4, step S20 of growing the second metal 20 includes a step of precipitating a trace of a third metal on the surface of the first metal nanoparticle 10 (S21) and a step of replacing the third metal precipitated on the edge of the first metal nanoparticle 10 with the second metal 20 (S22).

Step S21 of precipitating a trace of a third metal on the surface of the first metal nanoparticle 10 includes preparing a mixed solution of the first metal nanoparticle 10 and a stabilizer and adding a precursor of the third metal and a reducer to the mixed solution to conduct a reaction thereof.

The stabilizer may be a surfactant such as cetrimonium bromide (CTAB).

The third metal may be selected from the group consisting of Ag, Cu, Ni, and combinations thereof, and in one example, may be silver (Ag). At this time, the precursor of the third metal may be silver nitrate ($AgNO_3$).

The reducer may be selected from the group consisting of ascorbic acid, sodium borohydride ($NaBH_4$), carboxylic acid, and combinations thereof. The precursor of the third metal is reduced by the reducer and is precipitated on the surface of the first metal nanoparticle 10.

If the precursor of the third metal is excessively added to the mixed solution, an excessively large amount of the third metal may be precipitated on the surface of the first metal nanoparticle 10. In this case, when the third metal is replaced with the second metal 20, the reaction time may be increased. Further, a separate step of removing the third metal may be necessary. Thus, it is desirable to add a small amount of precursor of the third metal to the mixed solution so that only a trace of the third metal is precipitated on the surface of the first metal nanoparticle 10. In this example, the term "precipitation of a trace of the third metal" means precipitation of the third metal on the surface of the first metal nanoparticle 10 to an extent of formation of a very thin coating layer thereof. The amount of third metal to be precipitated may be appropriately adjusted depending on the average particle size and shape of the first metal nanoparticle 10. For example, the third metal may be precipitated in an amount corresponding to an atomic ratio of greater than 0% and less than 20%. The atomic ratio of the third metal may be an element ratio of the third metal to the first metal.

Step S22 of replacing the third metal precipitated on the edge of the first metal nanoparticle 10 with the second metal 20 includes adding an acid solution and the precursor of the second metal 20 to the resulting product of step S21 of precipitating the third metal to conduct a reaction thereof.

The acid solution may be selected from the group consisting of hydrochloric acid, nitric acid, sulfuric acid, and combinations thereof.

The second metal 20, in one example may be platinum (Pt). At this time, the precursor of the second metal 20 may be chloroplatinic acid ($H_2PtCl_6$).

The third metal is replaced with the second metal 20 through a galvanic replacement reaction. In this example, the term "galvanic replacement reaction" is a reaction that takes place where a metal ion having relatively high reduction potential and metal having relatively low reduction potential meet in a solution and stoichiometrically react with each other such that the metal ion having high reduction potential is metallized and the metal having low reduction potential is ionized. The result is that the metal ion having high reduction potential is stabilized in the form of metal.

In the present disclosure, a galvanic replacement reaction occurs between the third metal, i.e. $Ag^0$, which was precipitated in a trace amount on the surface of the first metal nanoparticle 10, and a metal ion, i.e. $Pt^{4+}$, which is derived from the precursor of the second metal 20. At this time, the galvanic replacement reaction occurs at the edge of the first metal nanoparticle 10, which has higher surface energy than the face thereof, and $Pt^{4+}$ grows along the edge in a $Pt^0$ form.

As a result, as shown in FIG. 3, the second metal 20 grows along the edge of the first metal nanoparticle 10, thereby forming a frame having the same shape as the polyhedral shape of the first metal nanoparticle 10.

Step S30 of removing the first metal nanoparticle 10 may include etching the first metal nanoparticle 10, on the edge of which the second metal 20 has grown to form the frame, in a solution using an etching agent. Specifically, only the first metal nanoparticle 10 may be removed by introducing an etching agent into the resulting product of step S20 of growing the second metal 20.

Figure 5:
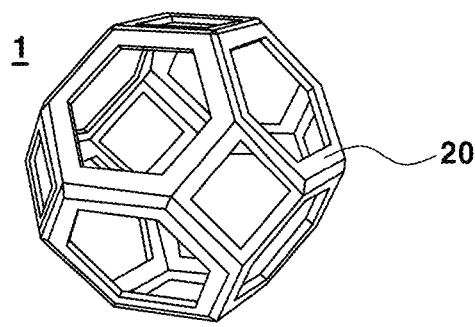
FIG. 5 is a view schematically showing a catalyst for a fuel cell according to the present disclosure.

FIG. 5 is a view schematically showing a catalyst 1 for a fuel cell according to the present disclosure. The catalyst 1 may be a material including only the frame of the second metal 20, from which the first metal nanoparticle 10 has been removed.

The etching agent may be appropriately selected depending on the material of the first metal nanoparticle 10. The first metal may be gold (Au). At this time, the etching agent may be chloroauric acid ($HAuCl_4$).

Step S30 of removing the first metal nanoparticle 10 may include removing the first metal nanoparticle 10 so that the first metal is left behind on the inner surface of the frame of the second metal 20 in the form of a thin film. The first metal may be prevented from being completely removed by adjusting the concentration of the etching agent and the etching time. The first metal left behind is present on the inner surface of the frame of the second metal 20 in the form of a thin film and serves to support the frame of the second metal 20. Accordingly, the durability of the catalyst 1 is further improved.

The method of preparing the catalyst 1 for a fuel cell according to the present disclosure may further include a step of separating the etched first metal from the resulting product of step S30 of removing the first metal nanoparticle 10 and preparing the first metal nanoparticle 10 from the first metal.

The catalyst 1 may be separated through centrifugation of the resulting product of step S30 of removing the first metal nanoparticle 10. The first metal dissolved in a supernatant may be separated by adding a reducer to the supernatant.

Figure 6:
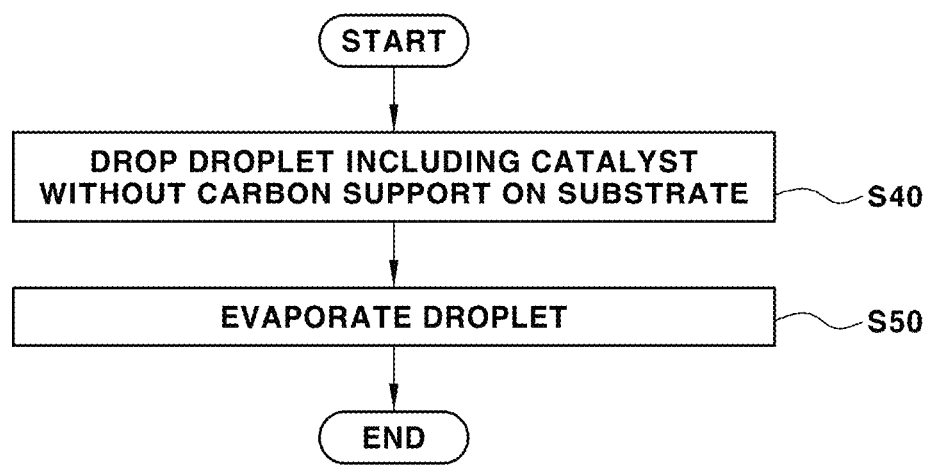
FIG. 6 is a flowchart showing a method of preparing a catalyst layer for a fuel cell according to the present disclosure.

FIG. 6 is a flowchart showing a method of preparing a catalyst layer for a fuel cell according to the present disclosure. Referring to FIG. 6, the catalyst layer preparation method includes a step of dropping a droplet containing the above-described catalyst 1 onto a substrate (S40) and a step of evaporating the droplet (S50).

The droplet may be a concentrated aqueous solution containing the catalyst 1. The thickness of the finally obtained catalyst layer may be adjusted by adjusting the amount of the droplet to be dropped.

Step S50 of evaporating the droplet may be performed at a temperature of 30° C. to 70° C.

Figure 7:
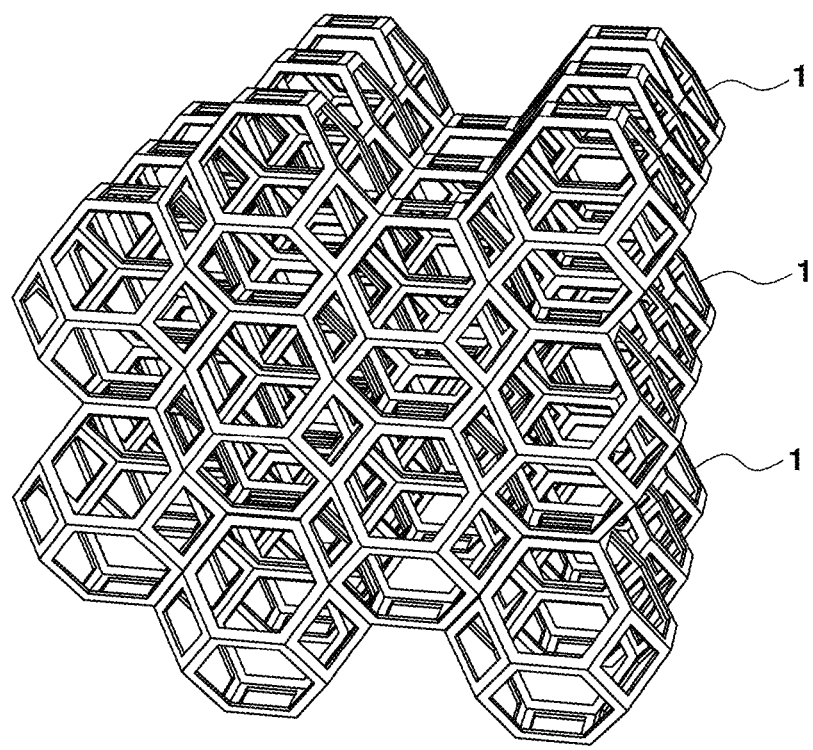
FIG. 7 is a view schematically showing the self-assembled state of the catalyst according to the present disclosure.

When the droplet is evaporated, the catalyst is self-assembled and forms a catalyst layer. FIG. 7 is a view schematically showing the self-assembled state of the catalyst 1. Referring to FIG. 7, the catalyst 1 is densified while maintaining the shape thereof, and consequently forms a catalyst layer.

The catalyst layer may have a thickness of 2 μm to 12 μm. The thickness of the catalyst layer may be observed and measured using, for example, a transmission electron microscope (TEM).

Hereinafter, the present disclosure is described in more detail with reference to examples set forth herein. These examples are provided only for illustration of the present disclosure and should not be construed as limiting the scope of the present disclosure.

Example 1

Figure 8A:
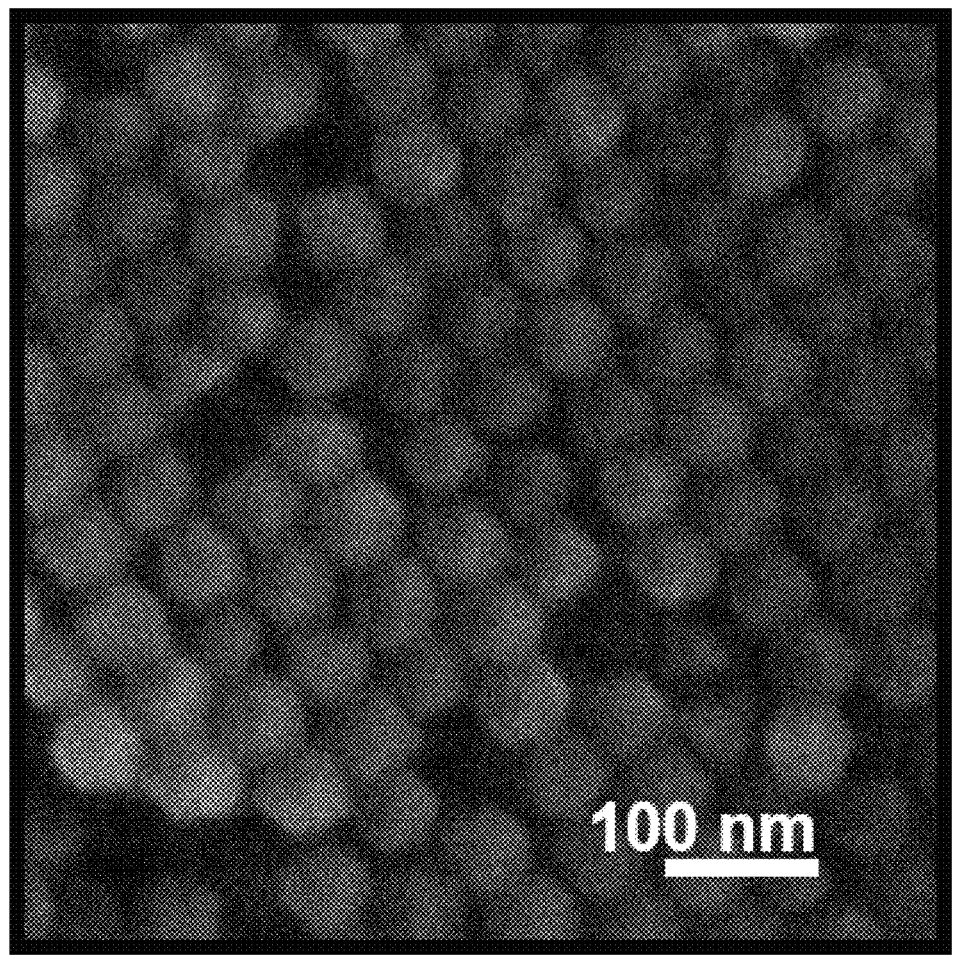
FIG. 8A shows the result of analysis of a gold nanoparticle used in Example 1 using a transmission electron microscope (TEM).

A mixed solution, which includes 10 ml of gold (Au) nanoparticle and 15 ml of cetrimonium bromide (CTAB) as a stabilizer, was prepared. FIG. 8A shows the result of analysis of the gold nanoparticle using a transmission electron microscope (TEM).

Figure 8B:
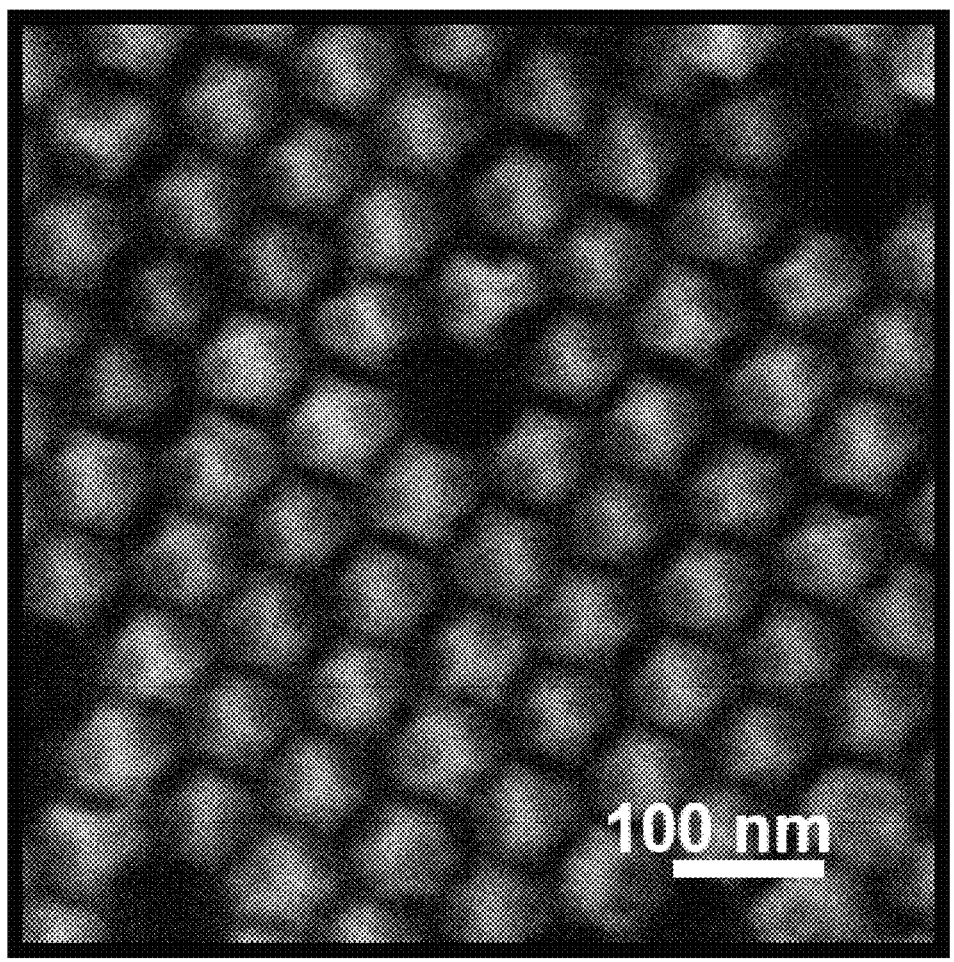
FIG. 8B shows the result of analysis of the gold nanoparticle, on which platinum has grown, in Example 1 using a transmission electron microscope (TEM).

30 μl of 2 mM silver nitrate ($AgNO_3$) and 960 μl of 0.1 M ascorbic acid were added to the above mixed solution. A reaction thereof was conducted in an oven at about 70° C. for about 1 hour to precipitate a trace of silver (Ag) on the surface of the gold nanoparticle. 960 μl of 0.1 M hydrochloric acid (HCl) and 165 μl of 2 mM chloroplatinic acid ($H_2PtCl_6$) were added to the resulting product. A reaction thereof was conducted in an oven at about 70° C. for about 3 hours so that a galvanic replacement reaction occurs between silver)($Ag^0$) and a platinum ion ($Pt^{4+}$) to grow platinum (Pt) along the edge of the gold nanoparticle. FIG. 8B shows the result of analysis of the gold nanoparticle, on which platinum has grown, using a transmission electron microscope (TEM).

Figure 8C:
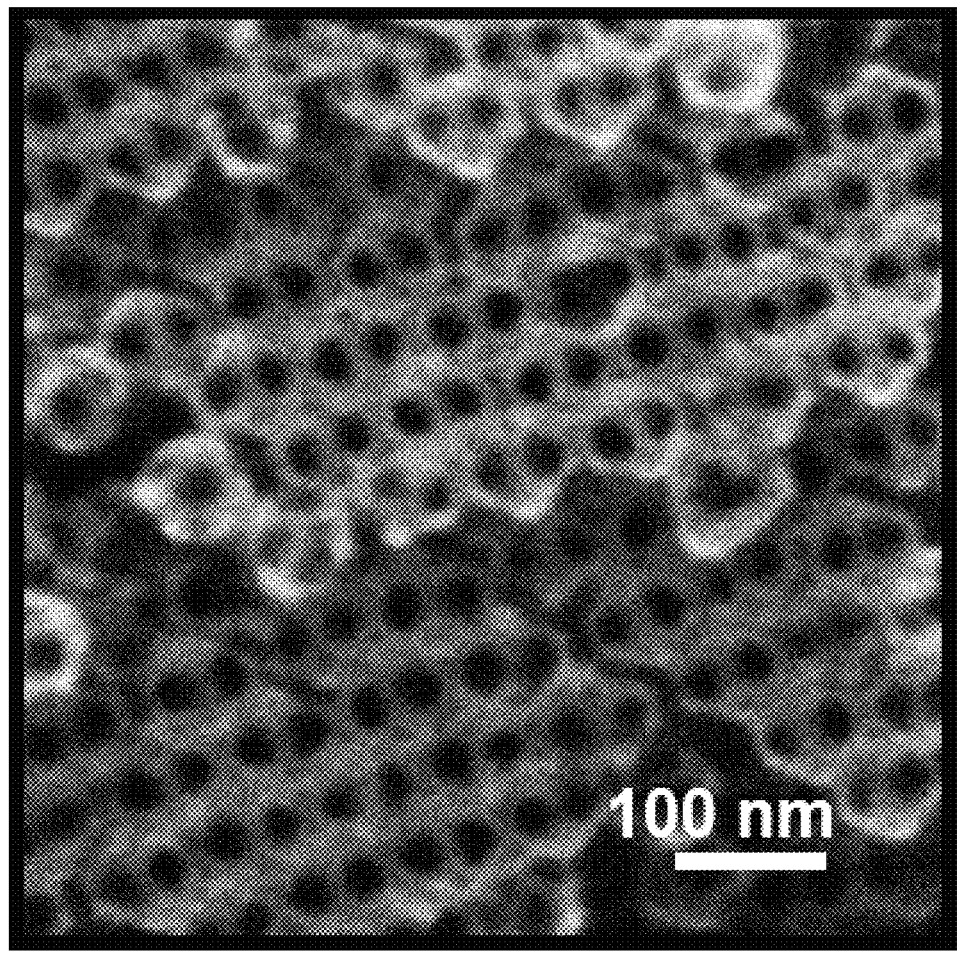
FIG. 8C shows the result of analysis of a catalyst prepared in Example 1 using a transmission electron microscope (TEM).

Chloroauric acid ($HAuCl_4$) was introduced into the resulting product to oxidize gold (Au) of the gold nanoparticle to a gold ion ($Au^{1+}$), thereby removing the gold nanoparticle. FIG. 8C shows the result of analysis of the finally obtained catalyst using a transmission electron microscope (TEM).

Figure 9A:
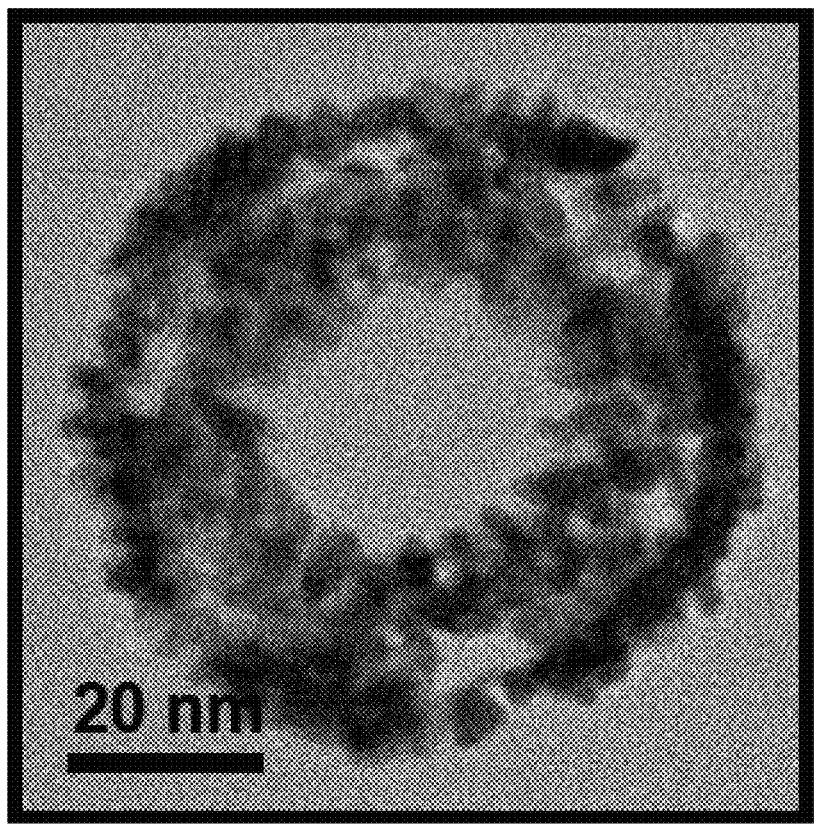
FIGS. 9A-9C show the results of measuring the shape and element distribution of the catalyst of Example 1 using a transmission electron microscope (TEM) and an Energy dispersive X-ray spectroscope (EDS).
Figure 9B:
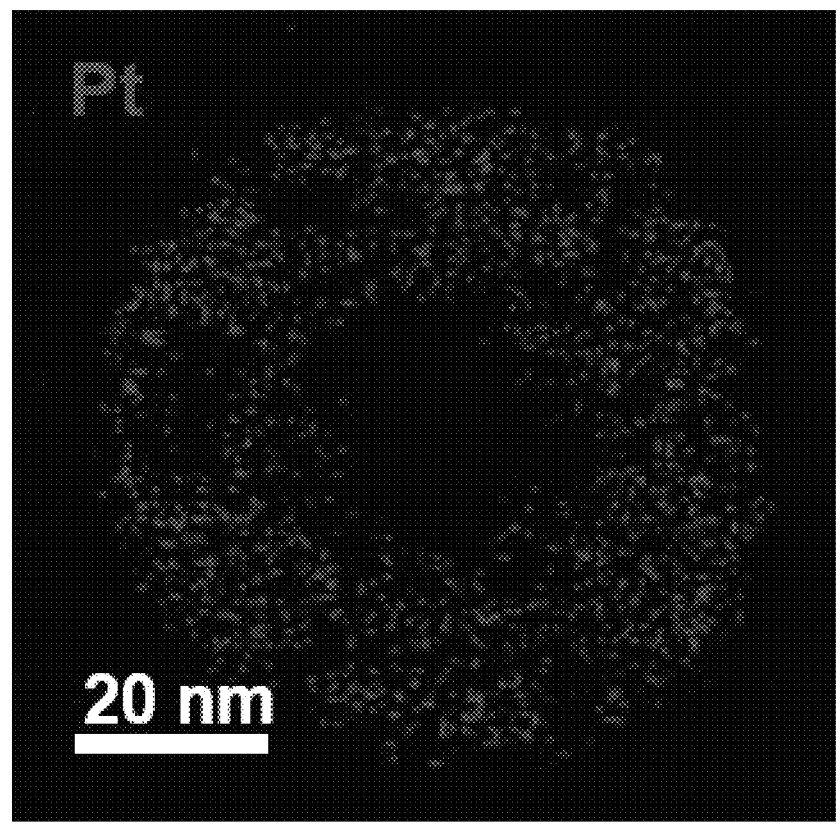
Figure 9C:
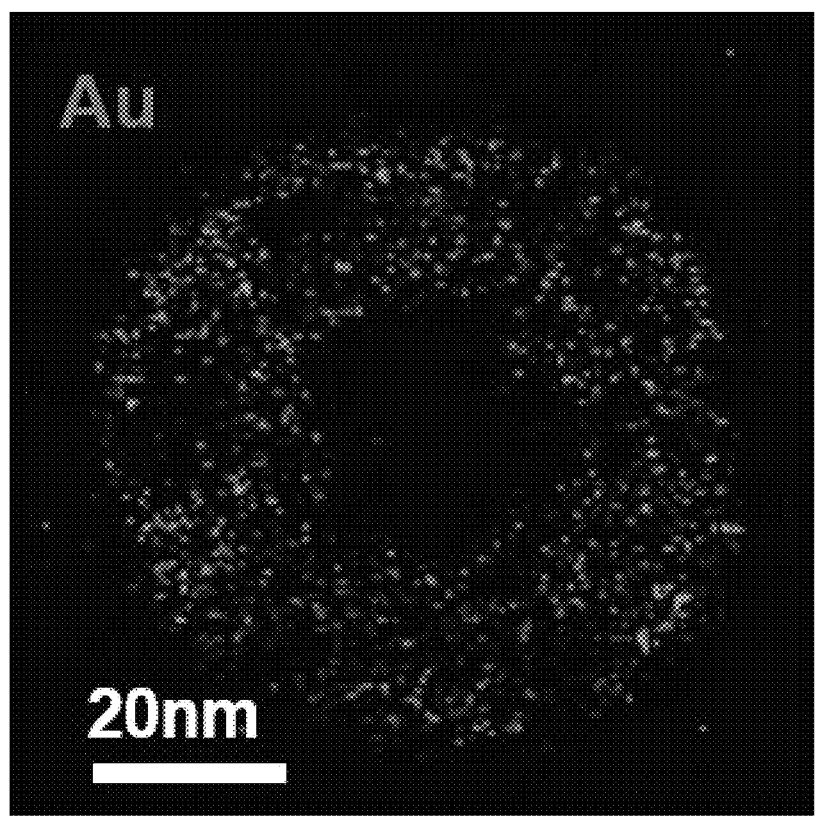

FIGS. 9A-9C show the results of measuring the shape and element distribution of the catalyst using a transmission electron microscope (TEM) and an Energy dispersive X-ray spectroscope (EDS). Specifically, FIG. 9A shows measurement of the shape of the catalyst. FIG. 9B shows measurement of the element distribution of platinum (Pt) included in the catalyst. FIG. 9C shows measurement of the element distribution of gold (Au) included in the catalyst.

Referring to FIGS. 9A and 9B, the catalyst has a structure in which the gold nanoparticle has been removed and only the platinum (Pt) frame is left behind. Referring to FIG. 9C, a gold (Au) element derived from the gold nanoparticle is present on the inner surface of the platinum (Pt) frame in the form of a thin film and supports the frame.

Figure 10A:
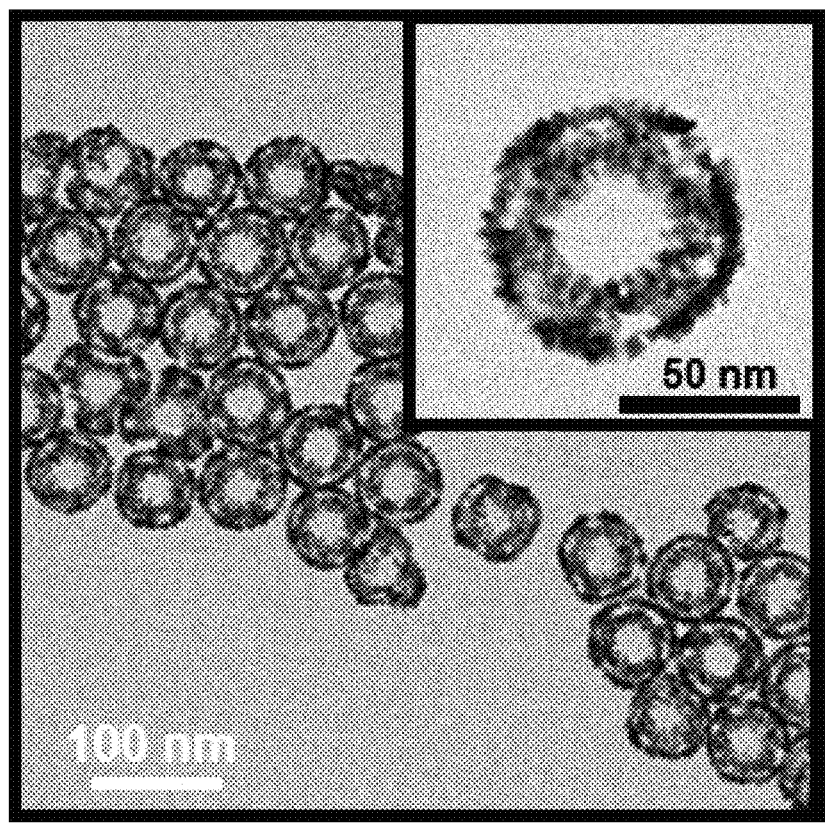
FIG. 10A shows the result of analysis of the catalyst of Example 1 using a transmission electron microscope (TEM) on a different scale.
Figure 10B:
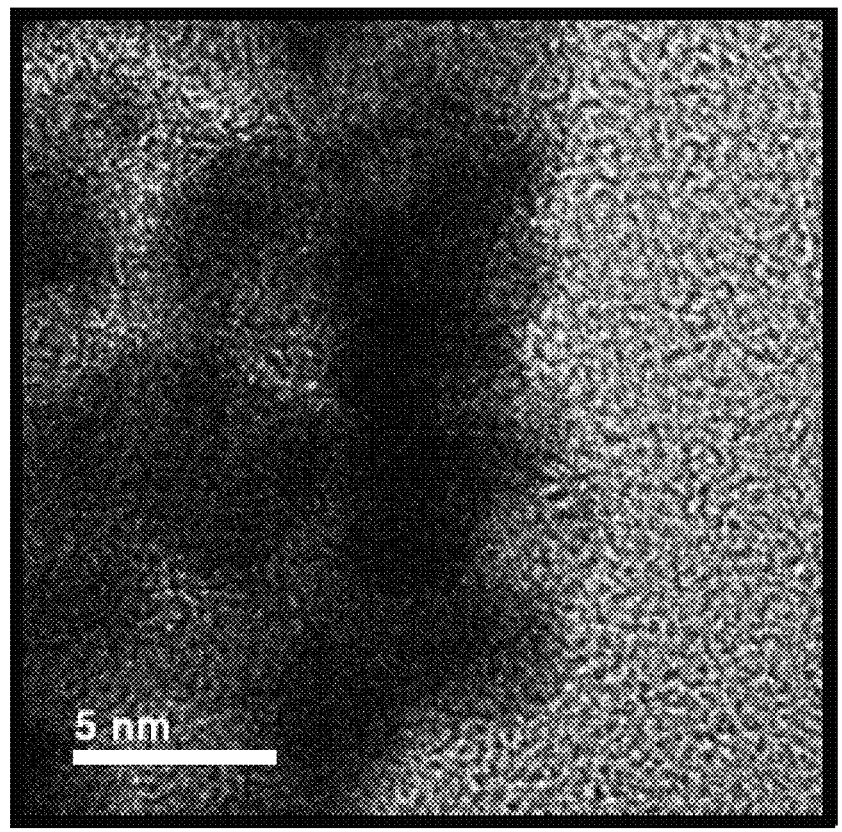
FIG. 10B shows a portion of the catalyst of Example 1 in an enlarged form to measure the thickness of a platinum (Pt) frame of the catalyst.

FIG. 10A shows the result of analysis of the catalyst using a transmission electron microscope (TEM) on a different scale. FIG. 10B shows a portion of the catalyst in an enlarged form to measure the thickness of the platinum (Pt) frame of the catalyst.

Referring to FIG. 10A, the catalyst has a structure in which the gold nanoparticle has been removed and only the platinum (Pt) frame is left behind. Referring to FIG. 10B, the frame has a thickness of about 11±1 nm.

Example 2

A catalyst was prepared in the same manner as in Example 1, except that the amount of added chloroplatinic acid ($H_2PtCl_6$), which was the precursor of the second metal, was increased to 330 μl. The result of analysis of the catalyst according to Example 2 using a transmission electron microscope (TEM) is shown in FIGS. 11A and 11B.

Figure 11A:
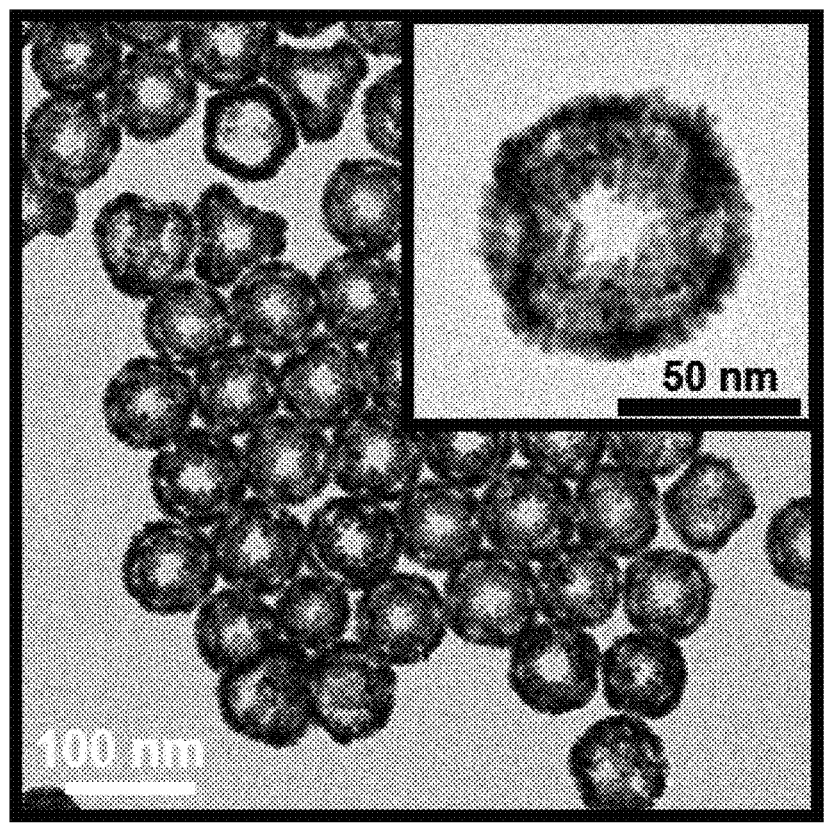
FIG. 11A shows the result of analysis of a catalyst of Example 2 using a transmission electron microscope (TEM) on a different scale.
Figure 11B:
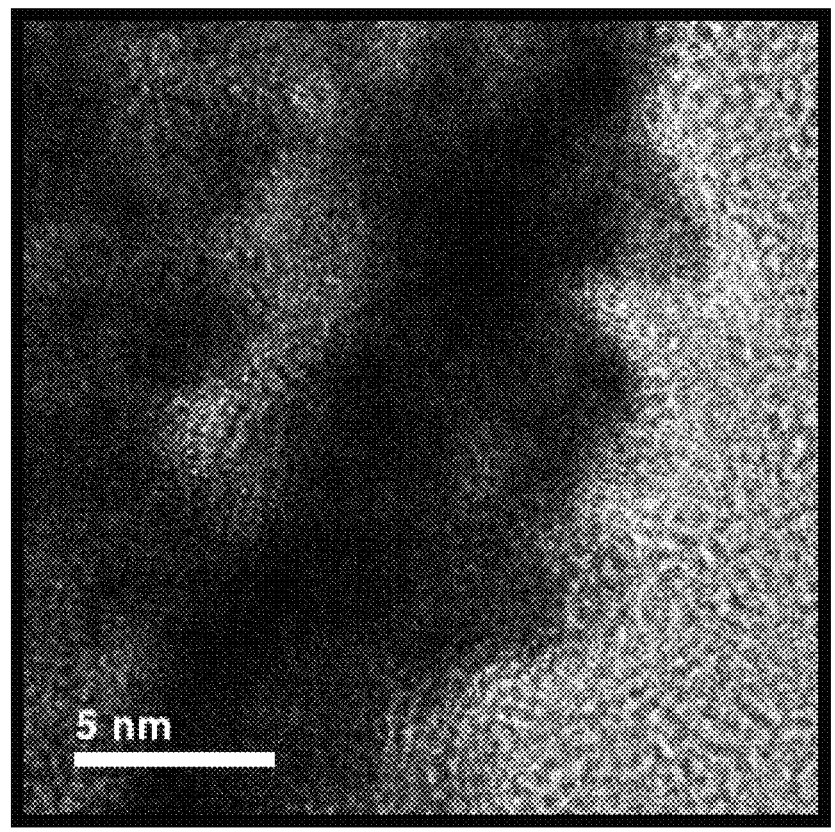
FIG. 11B shows a portion of the catalyst of Example 2 in an enlarged form to measure the thickness of a platinum (Pt) frame of the catalyst.

FIG. 11A shows the result of analysis of the catalyst using a transmission electron microscope (TEM) on a different scale. FIG. 11B shows a portion of the catalyst in an enlarged form to measure the thickness of the platinum (Pt) frame of the catalyst.

Referring to FIG. 11A, the catalyst has a structure in which the gold nanoparticle has been removed and only the platinum (Pt) frame is left behind. Referring to FIG. 11B, the thickness of the frame is slightly greater than that in Example 1. Specifically, the frame has a thickness of about 15±1 nm.

Example 3

A catalyst was prepared in the same manner as in Example 1, except that the amount of added chloroplatinic acid ($H_2PtCl_6$), which was the precursor of the second metal, was increased to 660 μl. The result of analysis of the catalyst according to Example 3 using a transmission electron microscope (TEM) is shown in FIGS. 12A and 12B.

Figure 12A:
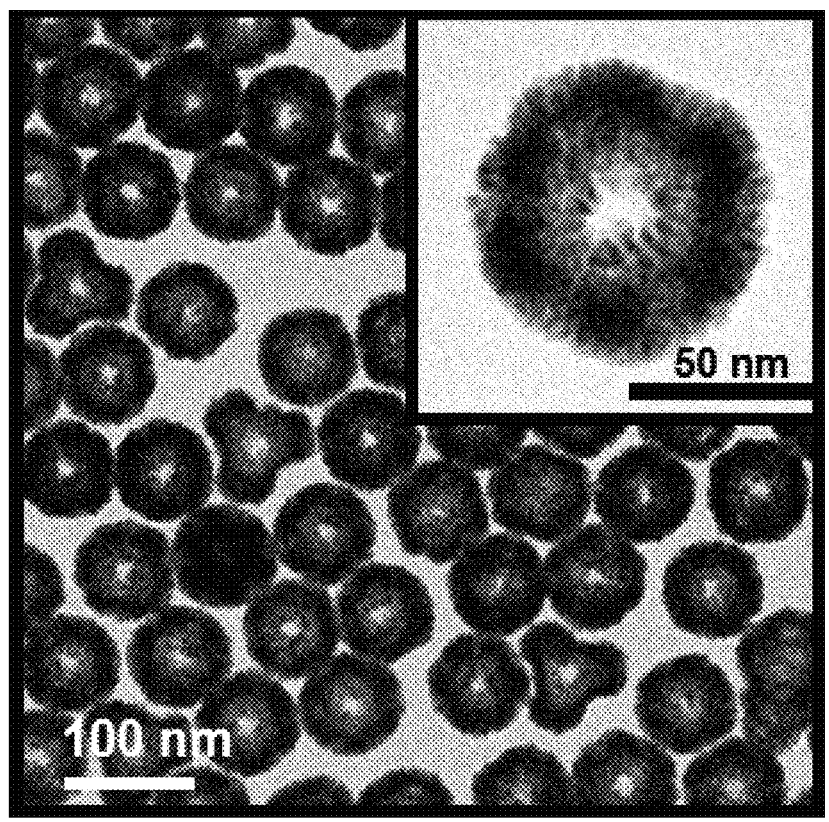
FIG. 12A shows the result of analysis of a catalyst of Example 3 using a transmission electron microscope (TEM) on a different scale.
Figure 12B:
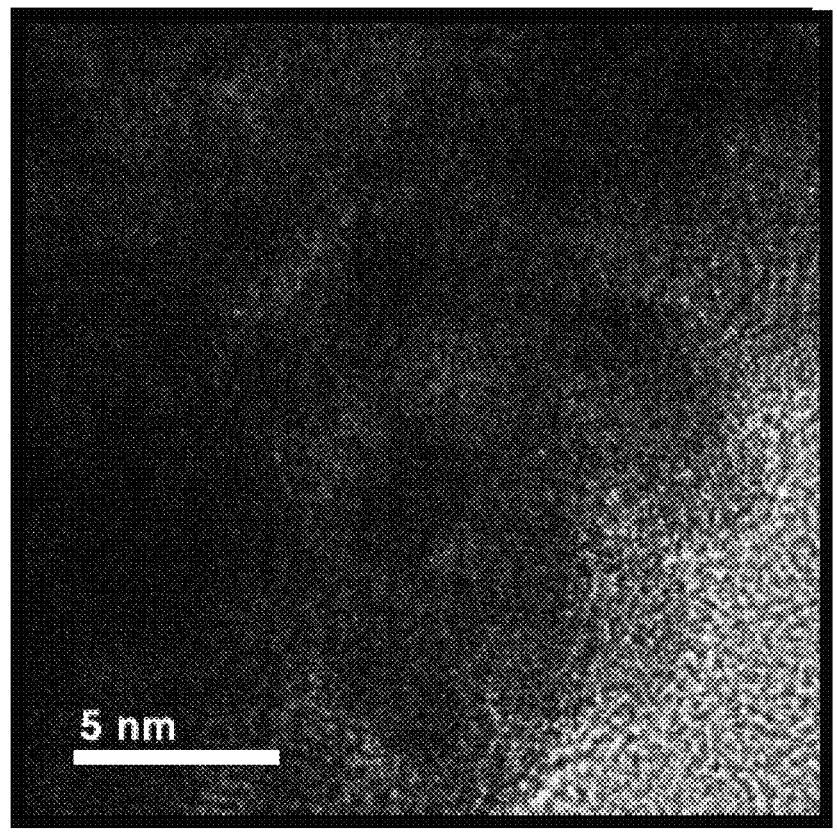
FIG. 12B shows a portion of the catalyst of Example 3 in an enlarged form to measure the thickness of a platinum (Pt) frame of the catalyst.

FIG. 12A shows the result of analysis of the catalyst using a transmission electron microscope (TEM) on a different scale. FIG. 12B shows a portion of the catalyst in an enlarged form to measure the thickness of the platinum (Pt) frame of the catalyst.

Referring to FIG. 12A, the thickness of the platinum (Pt) frame of the catalyst is much greater than that in Example 1. Specifically, referring to FIG. 12B, the frame has a thickness of about 25±1 nm.

Example 4

A catalyst layer for a fuel cell was prepared using the catalyst according to Example 3. A droplet including the catalyst was dropped in an amount of about 3 μl onto glassy carbon and was dried at about 70° C. for about 5 minutes, thereby obtaining the catalyst layer.

Figure 13A:
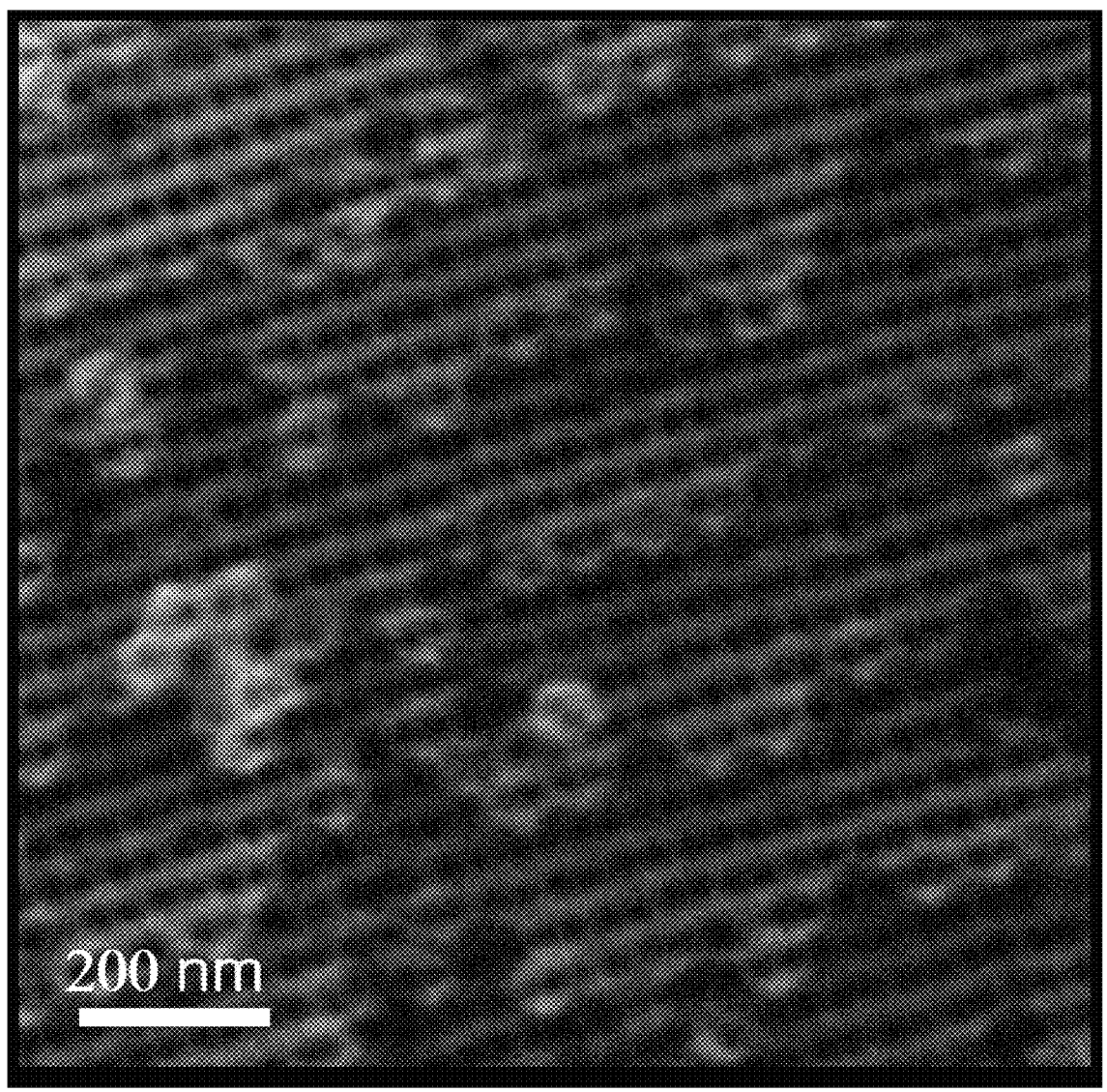
FIG. 13A shows the result of analysis of the top surface of a catalyst layer of Example 4 using a transmission electron microscope (TEM).
Figure 13B:
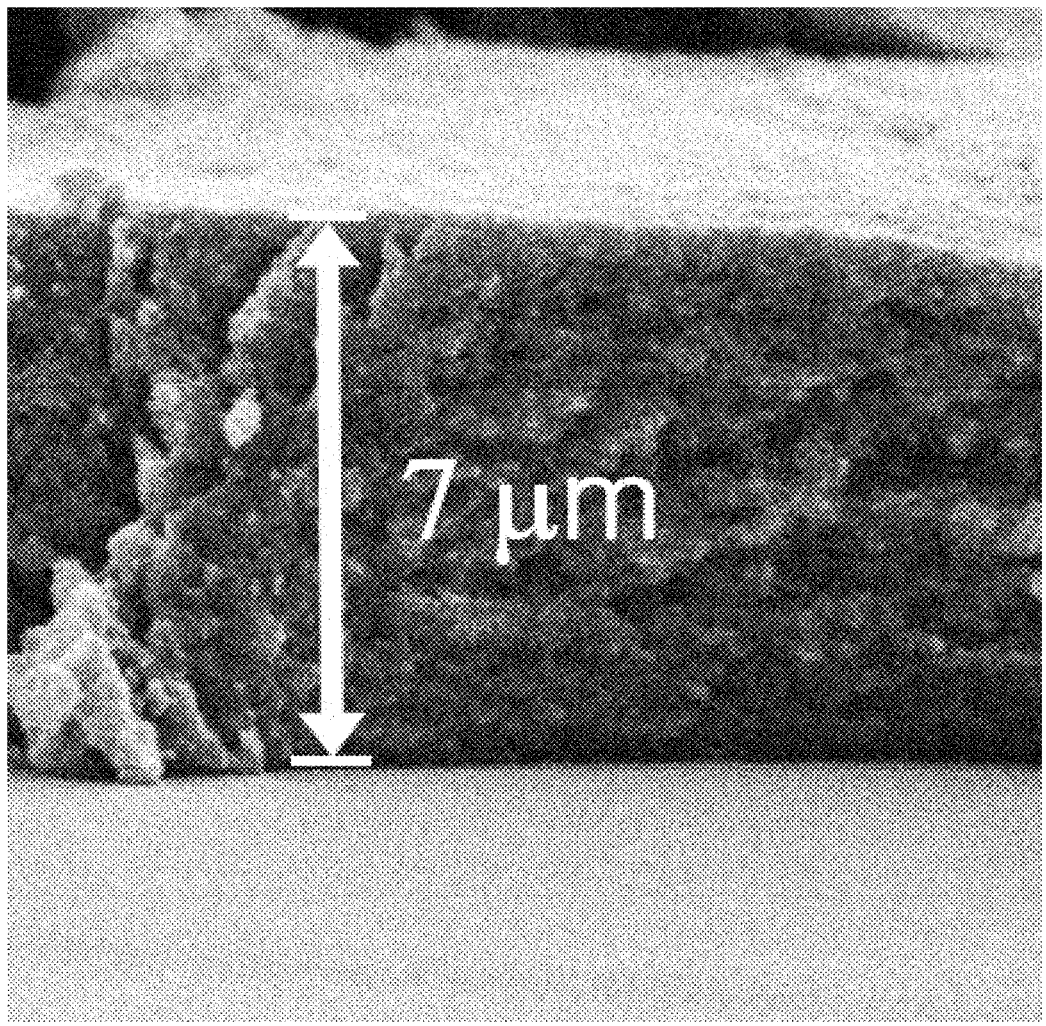
FIG. 13B shows the result of analysis of the cross-section of the catalyst layer using a scanning electron microscope (SEM).

FIG. 13A shows the result of analysis of the top surface of the catalyst layer using a transmission electron microscope (TEM). FIG. 13B shows the result of analysis of the cross-section of the catalyst layer using a scanning electron microscope (SEM).

Referring to FIG. 13A, the catalyst is densely self-assembled within the catalyst layer. Referring to FIG. 13B, the catalyst layer has a thickness of about 7 μm.

Figure 14A:
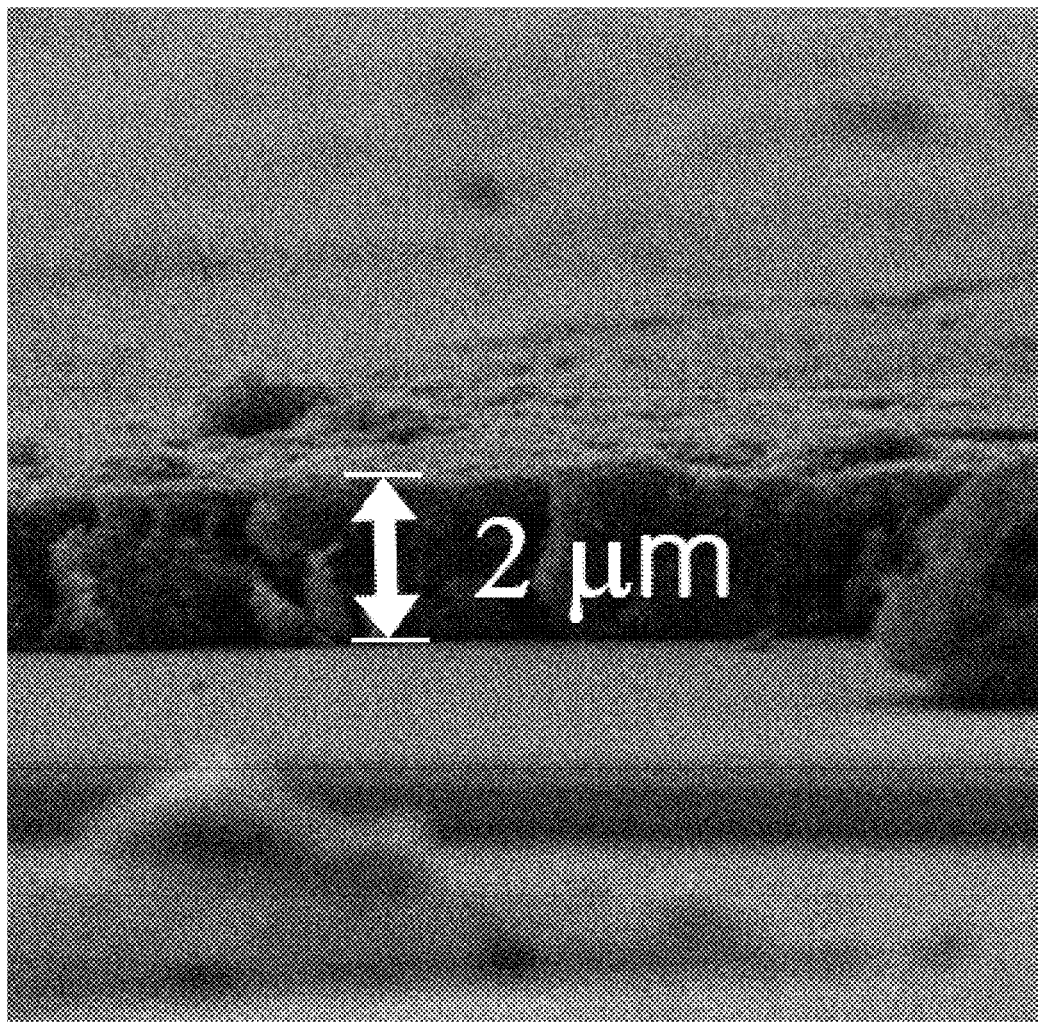
Figure 14B:
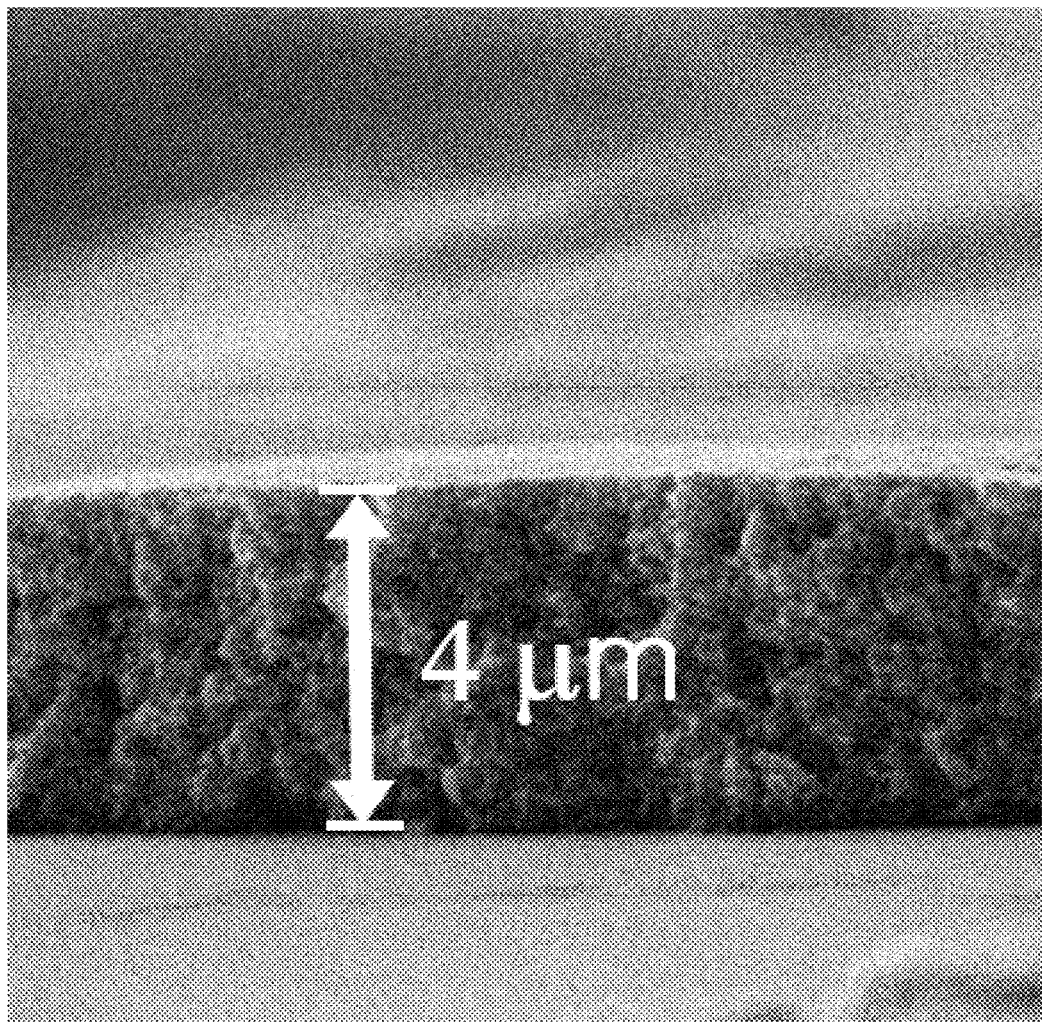
FIG. 14B shows the result of analysis of a catalyst layer having a thickness of 4 μm.
Figure 14C:
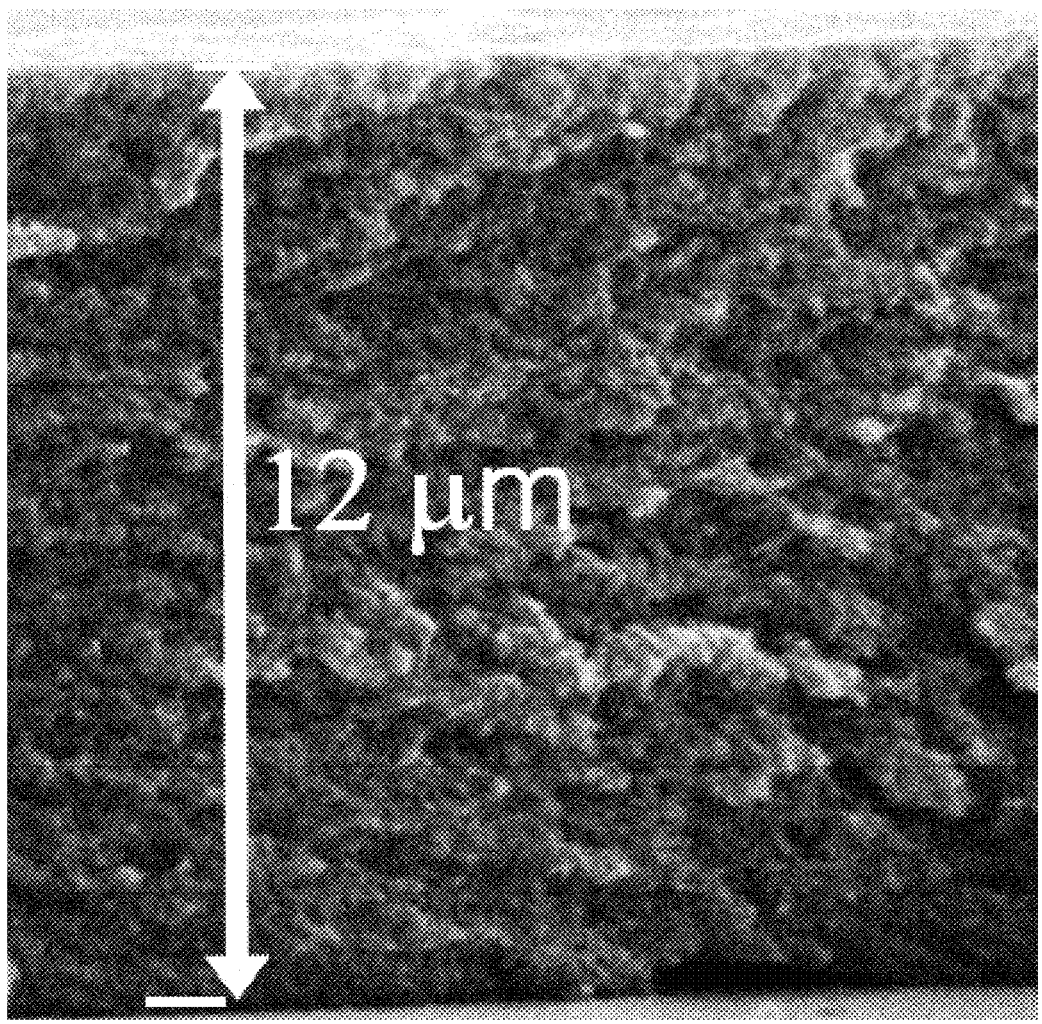
FIG. 14C shows the result of analysis of a catalyst layer having a thickness of 12 μm.

The thickness of the catalyst layer may be adjusted by adjusting the amount of droplet to be dropped. FIGS. 14A-14O show the results of analysis of the cross-sections of the catalyst layers, which were formed to have thicknesses of 2 μm, 4 μm and 12 μm by appropriately adjusting the amount of droplet to be dropped, using a scanning electron microscope (SEM).

Test Example 1

Figure 15A:
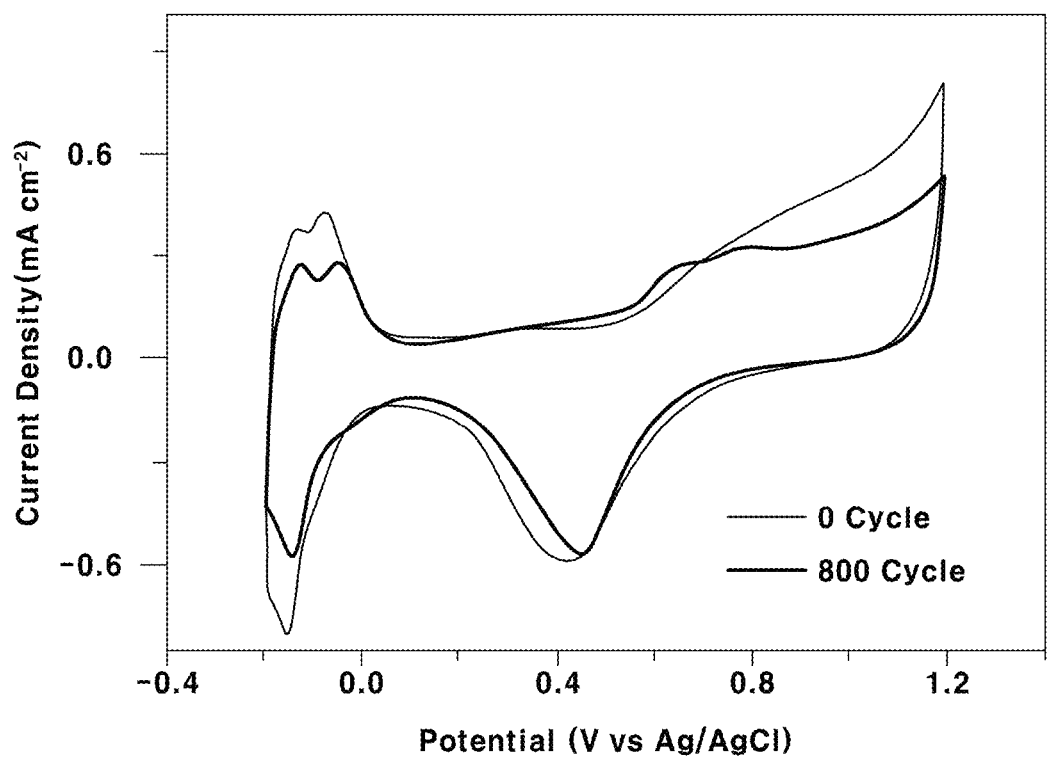
FIG. 15A shows the result of evaluating the durability of a catalyst layer according to a comparative example.
Figure 15B:
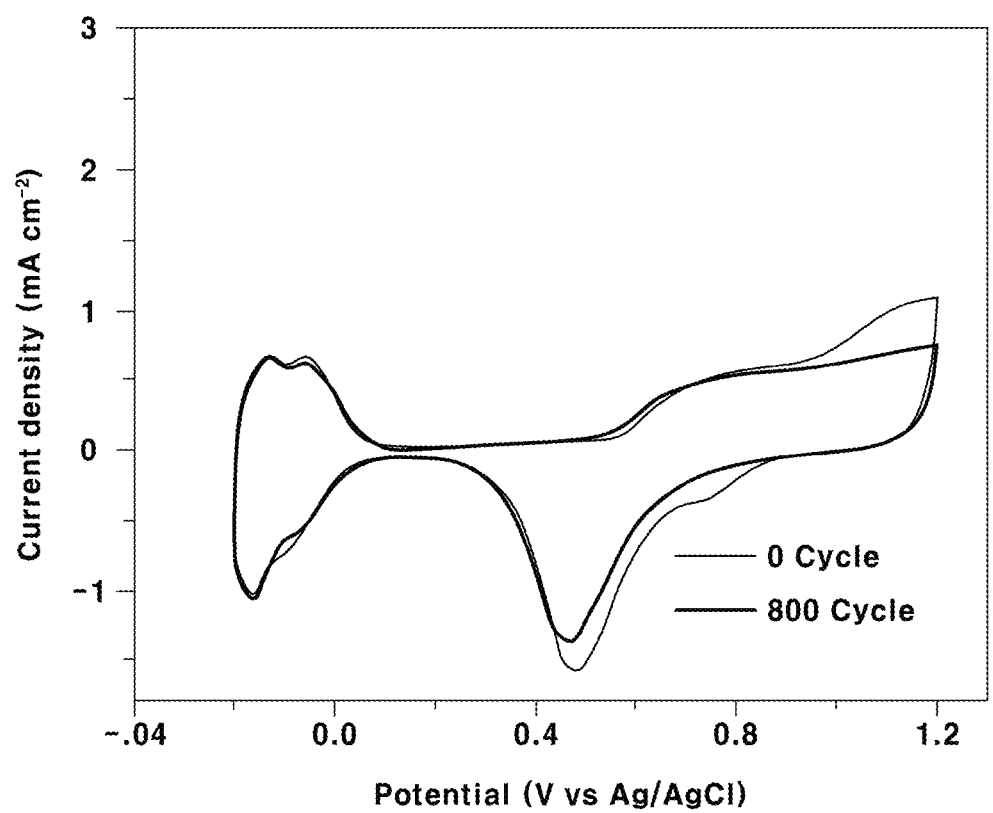
FIG. 15B shows the result of evaluating the durability of the catalyst layer of Example 4.

The durability of the catalyst layer (thickness 7 μm) according to Example 4 was evaluated. As a comparative example, a catalyst layer including 40% by weight of Pt/C, commercially available from Alfa Aesar, was used. Charging/discharging was conducted about 800 times under the condition of 100 mv/s. The test results are shown in FIGS. 15A and 15B. FIG. 15A shows the result of evaluating the durability of the catalyst layer according to the comparative example, and FIG. 15B shows the result of evaluating the durability of the catalyst layer according to Example 4.

Referring to FIG. 15A, the catalyst layer according to the comparative example had a low current density. Further, the current density was reduced by about 23% when charging/discharging was conducted 800 times.

On the other hand, referring to FIG. 15B, the catalyst layer according to Example 4 had a high current density. Further, the current density was reduced only by about 6% even when charging/discharging was conducted 800 times.

Test Example 2

The electrochemical active surface areas (ECSAs) and the current densities of the catalyst layers according to Example 4 and the comparative example were measured with different thicknesses thereof. The test results are shown in FIG. 16.

Figure 16:
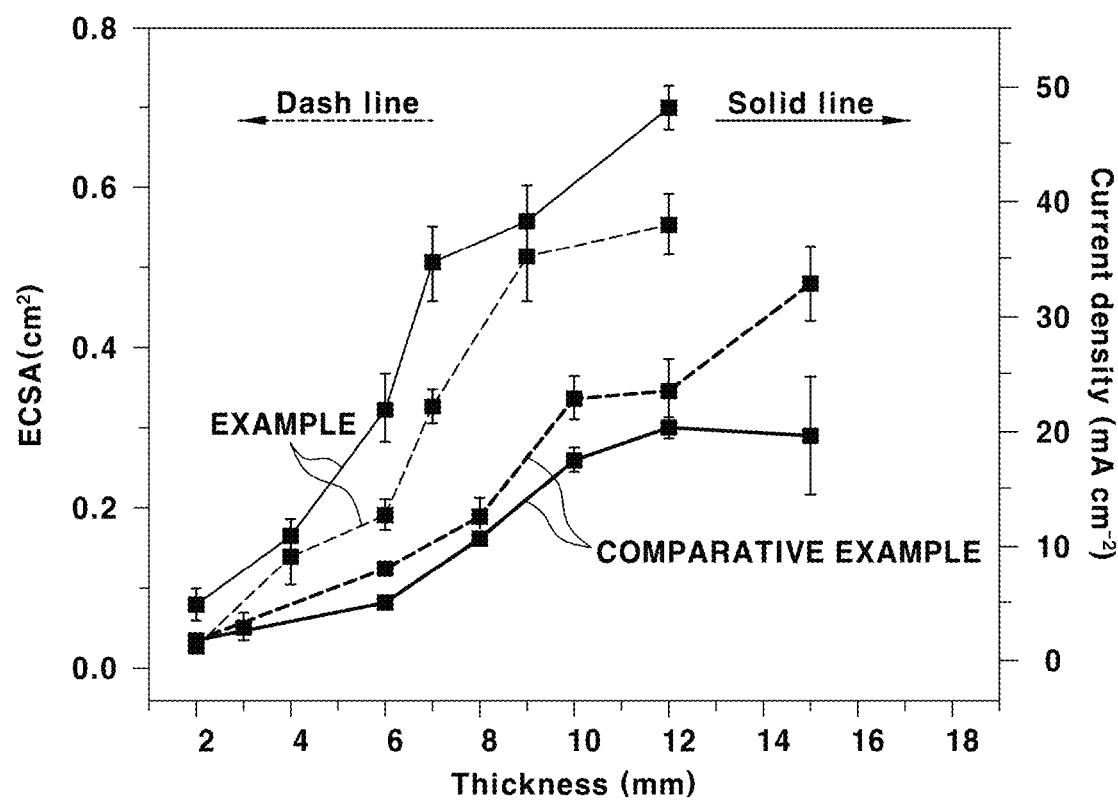
FIG. 16 shows the results of measuring the electrochemical active surface areas (ECSAs) and the current densities of the catalyst layers according to Example 4 and the comparative example with different thicknesses.

Referring to FIG. 16, the electrochemical active surface area of the catalyst layer according to the present disclosure was greatly increased in response to an increase in the thickness thereof compared to the comparative example. In addition, the current density of the catalyst layer according to the present disclosure was greatly increased in response to an increase in the thickness thereof compared to the comparative example.

As is apparent from the above description, according to the present disclosure, it is possible to obtain a catalyst for a fuel cell that is self-supported without a carbon support and has excellent activity for an oxygen reduction reaction.

In addition, it is possible to obtain a catalyst for a fuel cell, which prevents a reduction in the active surface area of catalyst metal attributable to a carbon support.

In addition, it is possible to obtain a catalyst for a fuel cell, which prevents the occurrence of structural instability attributable to corrosion of a carbon support.

In addition, it is possible to obtain a catalyst layer for a fuel cell, in which fuel smoothly moves into the catalyst, thereby facilitating and promoting a reaction in an active region of the catalyst.

It will be appreciated by those having ordinary skill in the art that the effects achievable through the disclosure are not limited to those that have been particularly described hereinabove. Other effects of the disclosure will be more clearly understood from the above detailed description.

The disclosure has been described in detail with reference to embodiments thereof. However, it will be appreciated by those having ordinary skill in the art that changes may be made in these embodiments without departing from the principles and spirit of the disclosure, the scope of which is defined in the appended claims and their equivalents.

What is claimed is:

1. A method of preparing a catalyst for a fuel cell, the method comprising:
   preparing a first metal nanoparticle;
   growing a second metal along an edge of the first metal nanoparticle; and
   removing the first metal nanoparticle,
   wherein the growing the second metal comprises precipitating a trace of a third metal on a surface of the first metal nanoparticle and replacing the third metal precipitated on the edge of the first metal nanoparticle with the second metal.

2. The method of claim 1, wherein the first metal is selected from the group consisting of Au, Cu, Co, and combinations thereof.

3. The method of claim 1, wherein the first metal nanoparticle has an average particle size of 40 nm to 70 nm.

4. The method of claim 1, wherein the second metal is selected from the group consisting of Pt, Rh, Ru, and combinations thereof.

5. The method of claim 1, wherein the second metal site-selectively grows along the edge of the first metal nanoparticle.

6. The method of claim 1, wherein the third metal is selected from the group consisting of Ag, Cu, Ni, and combinations thereof.

7. The method of claim 1, wherein the third metal is replaced with the second metal through a galvanic replacement reaction.

8. The method of claim 1, wherein the first metal nanoparticle has a polyhedral shape, and wherein the second metal grows along the edge of the first metal nanoparticle to form a frame having a same shape as the polyhedral shape of the first metal nanoparticle.

9. The method of claim 1, wherein the removing the first metal nanoparticle comprises etching the first metal nanoparticle in a solution using an etching agent.

10. The method of claim 8, wherein the first metal nanoparticle is removed so that the first metal is left behind on an inner surface of the frame of the second metal in a form of a thin film.

11. A method of preparing a catalyst layer for a fuel cell, the method comprising:
    dropping a droplet comprising a catalyst, which has been prepared using the method of claim 1, onto a substrate; and
    evaporating the droplet.

12. The method of claim 11, wherein the evaporating the droplet is performed at a temperature of 30° C. to 70° C.

13. The method of claim 11, wherein the catalyst is self-assembled as the droplet is evaporated.

14. The method of claim 11, wherein the catalyst layer has a thickness of 2 μm to 12 μm.

15. A method of preparing a catalyst layer for a fuel cell, the method comprising:
    preparing a catalyst for a fuel cell by preparing a first metal nanoparticle, growing a second metal along an edge of the first metal nanoparticle, and removing the first metal nanoparticle;
    dropping a droplet comprising the catalyst onto a substrate; and
    evaporating the droplet,
    wherein the catalyst is self-assembled as the droplet is evaporated.

16. The method of claim 15, wherein the evaporating the droplet is performed at a temperature of 30° C. to 70° C.

17. A method of preparing a catalyst layer for a fuel cell, the method comprising:
    preparing a catalyst for a fuel cell by preparing a first metal nanoparticle, growing a second metal along an edge of the first metal nanoparticle, and removing the first metal nanoparticle;
    dropping a droplet comprising the catalyst onto a substrate; and
    evaporating the droplet,
    wherein the catalyst layer has a thickness of 2 μm to 12 μm.

18. The method of claim 17, wherein the evaporating the droplet is performed at a temperature of 30° C. to 70° C.

\* \* \* \* \*